UNITED STATES PATENT OFFICE.

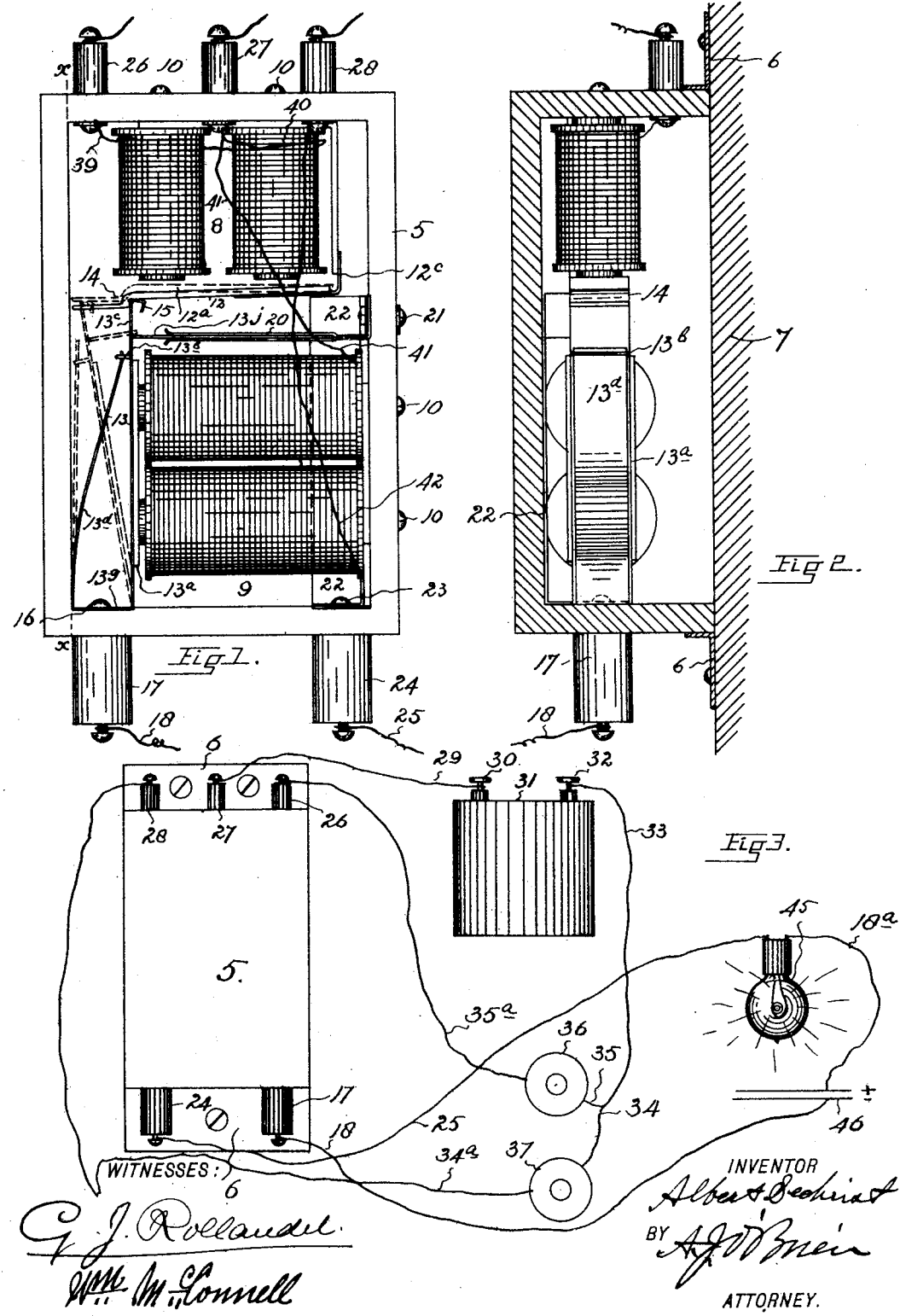

ALBERT SECHRIST, OF DENVER, COLORADO.

ELECTRIC-LIGHTING SYSTEM.

SPECIFICATION forming part of Letters Patent No. 476,422, dated June 7, 1892.

Application filed December 1, 1891. Serial No. 413,736. (No model.)

*To all whom it may concern:*

Be it known that I, ALBERT SECHRIST, a citizen of the United States of America, residing at Denver, in the county of Arapahoe and State of Colorado, have invented certain new and useful Improvements in Mechanism for Controlling Electric Lamps; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to mechanism for controlling incandescent electric lamps and is designed to accomplish the same object as the invention set forth in my previous application, Serial No. 405,054, filed September 7, 1891.

Hence my present invention consists of specific means for turning the lamps on and off from any part of a building or from any room in a house or block. This object I accomplish by the use of two electro-magnets located in a battery-circuit and provided with suitable armatures and push-buttons for alternately energizing the magnets, whereby the lamp-circuit is opened or closed, according as it is desired, to turn the light on or off.

The mechanism will be fully understood by reference to the accompanying drawings, in which is illustrated an embodiment of the invention.

In the drawings, Figure 1 is a front elevation of the mechanism; Fig. 2, a section taken on line $x\ x$, Fig. 1. Fig. 3 is a rear elevation of the box containing the magnets, showing also the lamp and battery circuits and the push-buttons.

In the views let the numeral 5 designate a small box composed of some suitable insulating material, preferably porcelain, and provided with suitable flanges 6, whereby the box may be secured to the wall 7 or wherever it is desired to locate the same. Within this box are placed two electro-magnets 8 and 9, secured thereto in any suitable manner, as by screws 10. These magnets are provided with movable spring-armatures 12 and 13, respectively. The free extremities of these armatures are fashioned to interlock when magnet 9 is energized and remain in engagement until the current is passed through the coils of the other magnet, when the armatures are disengaged or separated by the movement of armature 12. For this purpose the last-named armature is provided with a shoulder or ledge 14, located a short distance from its outer extremity. The engaging extremity of armature 13 is hook-shaped, as shown at 15. Armature 12 is composed of a plate $12^a$, of soft iron or other suitable magnetic material, and a spring-metal part $12^c$. Armature 13 is composed of a part $13^a$, formed of suitable magnetic material, as soft iron, and part $13^c$, formed of copper or other material possessing the required degree of electrical conductivity, since this armature forms a part of the circuit of the lamp or lamps to be controlled. Armature 13 is preferably provided with a spring $13^d$ continuous with part $13^c$. Spring $13^d$ is connected with part $13^c$ at one extremity by a part $13^g$, while at the opposite extremity the spring engages a loop $13^h$, formed upon part $13^c$ and of the same material. The spring moves freely within the loop and is constantly in engagement therewith. The armature 13 is secured to the box by a screw 16, which passes through the box into binding-post 17, to which leads a wire 18, passing to the lamp. Part $13^c$ of the armature 13 is provided with a right-angular projection $13^j$, located a short distance from its hooked extremity and adapted to engage a conductor 20, made fast to one side of the box by a screw 21. The body portion of conductor 20 is formed double, the parts being turned slightly outward at their free extremities in order to surely guide projection $13^j$ between them when magnet 9 is energized. The parts of conductor 20 grasp the projection $13^j$ with sufficient firmness to form a perfect electrical connection between the armature and the conductors. From the secured extremity of the conductor 20 and made fast thereto by means of screw 21 leads a plate 22, forming a good electrical conductor and extending to the end of the box, where it is secured by a screw 23, passing through the box and into a binding-post 24, to which leads the wire 25 of the lamp-circuit. To the opposite end of the box are secured the binding-posts 26, 27, and 28. To the post 27 leads a wire 29 from one pole 30 of the battery 31. From the other pole 32 of the battery leads the wire 33, which connects with or terminates at the junction of the branch wires 34 and 35, which lead to push-buttons 36 and 37, respectively, from which lead the wires 34ª and 35ª, the former to binding-post 28 and the latter to binding-post 26. From the inner extremity of the last-named binding-post or from the screw which secures said post to the box leads a wire 39 to the coils of magnet 8, and from this magnet leads another wire 40 to the binding-post 27, from which leads still another wire 41 to the coils of magnet 9, and from said magnet another wire 42 passes to binding-post 27.

In describing the operation of the invention let the numeral 45 designate a lamp or series of lamps connected with the main circuit 46 by wires 18 and 18ª. Assuming the parts to be in the relative positions shown in full lines in Fig. 1, the electric current may be said to pass from the main lamp-circuit or from one pole of the electric source supplying the lamps through wire 18 to and through the lamp, thence through wire 25 to binding-post 24, thence through plate 32, conductor 20, projection 13ʲ, armature 13, binding-post 17, and wire 18 back to the main circuit or to the other pole of the source of electricity. Hence the lamp-circuit is complete and the lamp burning. Now, if it is desired to turn off the lamp or lamps in this circuit, I press button 35, when the current may be said to pass from pole 32 of the battery through wire 33, branch wire 35, button 36, wire 35ª, binding-post 26, wire 39, the coils of the magnet 8, thence through wire 40, binding-post 27, and wire 29 to the other pole 30 of the battery. Magnet 8 being thus energized, draws its armature 12 to the position shown by dotted lines in Fig. 1, releasing armature 13, which immediately assumes the position shown by dotted lines under the influence of spring 13ᵈ, breaking the lamp-circuit by drawing projection 13ʲ from engagement with conductor 20 and extinguishing the lamp. Again, if it is desired to light the lamps, it is only necessary to press button 37, when the current passes from pole 32 of the battery through wire 33, branch wire 34, button 37, wire 34ª, binding-post 28, wire 42, the coils of magnet 9, wire 41, binding-post 27, and wire 29 to the other pole of the battery, again completing the battery-circuit. This time magnet 9 is energized and its armature 13 again thrown to the position shown in full lines, completing the lamp-circuit and so interlocking with armature 12 by the engagement of extremity 15 of the one with the shoulder 14 of the other that the lamp-circuit is maintained intact until the magnet 8 is again energized.

In the use of the invention the box 5 with its mechanism may be located in any part of the building and the push-buttons in any room from which it is desired to control the lamps. The wires leading from the battery to the push-buttons and to the box 5 may of course be small and inexpensive, since they only carry the battery-current. Hence it becomes practicable from the standpoint of economy to control the lamps from any room in any building. This cannot be economically done by the use of switch mechanism, since this mechanism must be located in the lamp-circuit and large expensive wires carrying the supply-current for the lamps must be employed. Hence the cost of running such wires to the different rooms of a building.

Having thus described my invention, what I claim is—

The combination, with an incandescent-lamp circuit, of means for controlling the same, consisting of a divided-battery circuit, two electro-magnets—one in each branch of the battery-circuit—provided with spring-armatures 12 and 13, adapted to lock together when brought in contact, armature 13 being in the lamp-circuit and consisting of magnetic material supplemented by a material of higher conductivity, a spring-clip 20, also in the lamp-circuit in the path of a projection 13ʲ on the armature 13 and adapted to make electrical contact with said projection when the two armatures are locked together, and push-buttons in each branch circuit, whereby either magnet may be energized accordingly as it may be desired to make or break the lamp-circuit, substantially as described.

In testimony whereof I affix my signature in presence of two witnesses.

ALBERT SECHRIST.

Witnesses:
WM. MCCONNELL,
G. J. ROLLANDEL.